United States Patent
Baumert et al.

(10) Patent No.: US 6,604,372 B2
(45) Date of Patent: Aug. 12, 2003

(54) AIR-CONDITIONING SYSTEM

(75) Inventors: Jochen Baumert, Frankfurt (DE); Jochen Engel, München (DE); Klaus-Juergen Bluhm, Steinbach (DE); Robert Höppler, Karlskron (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/163,803

(22) Filed: Jun. 5, 2002

(65) Prior Publication Data

US 2003/0041607 A1 Mar. 6, 2003

(30) Foreign Application Priority Data

Jun. 12, 2001 (DE) .......................... 101 28 307

(51) Int. Cl.⁷ .............................. F25B 5/00; F25D 23/12
(52) U.S. Cl. ........................................ 62/199; 62/259.2
(58) Field of Search ............................... 62/199, 196.3, 62/196.4, 197, 259.2, 200, 222, 223, 505; 361/688, 689, 704

(56) References Cited

U.S. PATENT DOCUMENTS

| | | | | |
|---|---|---|---|---|
| 3,388,559 A | * | 6/1968 | Johnson | 62/224 |
| 3,407,623 A | * | 10/1968 | Richardson et al. | 62/197 |
| 4,720,981 A | * | 1/1988 | Helt et al. | 62/113 |
| 5,220,809 A | * | 6/1993 | Voss | 62/259.2 |
| 6,116,040 A | * | 9/2000 | Stark | 62/259.2 |
| 6,341,496 B1 | * | 1/2002 | Kettner et al. | 62/225 |

FOREIGN PATENT DOCUMENTS

DE   199 25 744 A1   6/1999   ............ B60H/1/32

* cited by examiner

*Primary Examiner*—Marc Norman
(74) *Attorney, Agent, or Firm*—David M. Thimmig; Mayer, Brown, Rowe & Maw

(57) ABSTRACT

An air-conditioning system with an air-conditioning compressor, an electric motor and a refrigerant circuit, in particular for motor vehicles, the electric motor being controllable by an electronic control device and an expansion member arranged in the refrigerant circuit, a further expansion member is arranged between the high-pressure side of the expansion member and the suction side of the air-conditioning compressor in the refrigerant circuit, and the electronic control device is connected thermally conductively to the low-pressure side of the further expansion member. The further expansion member is controllable as a function of the temperature of the electronic control device.

2 Claims, 2 Drawing Sheets

AIR-CONDITIONING SYSTEM

The invention relates to an air-conditioning system with a compressor, with an electric motor and with a refrigerant circuit, in particular for motor vehicles, the electric motor being controllable by means of an electronic control device and an expansion member (valve or orifice tube) being arranged in the coolant circuit.

BACKGROUND OF THE INVENTION

For cooling the electronic control device in air-conditioning systems of the generic type, it is known from DE 199 25 744 to arrange the control device in such a way that the discharge of the lost heat takes place essentially via the refrigerant of the compression refrigerating system. In systems of this type, a cost-effective thermostatic expansion valve, with a statically permanently set wet-steam fraction, or an orifice tube is used in the refrigerant circuit. In this case, at many operating points, sufficient cooling is not ensured. At other operating points, in turn, the control device is cooled to a greater extent than is necessary, thus leading to marked losses of refrigerating capacity of the air-conditioning system.

SUMMARY OF THE INVENTION

The object of the present invention is to ensure sufficient cooling of the control device, while losses of refrigerating capacity are to be kept as low as possible.

This object is achieved, according to the invention, in that a further expansion member is arranged between the high-pressure side of the expansion member and the suction side of the compressor in the refrigerant circuit, to the low-pressure side of which the electronic control device is connected thermally conductively, and in that the further expansion member is controllable as a function of the temperature of the control device.

The air-conditioning system according to the invention ensures that the control device, in particular the power semiconductors, are cooled sufficiently for reliable operation, only a little cold being extracted from the refrigerant circuit and consequently a maximum cold quantity being available for air-conditioning purposes.

In an advantageous development of the air-conditioning system according to the invention, the further expansion member and preferably also the electronic control device are arranged within the housing of the compressor. In this case, the further expansion member delivers to the control device and, if appropriate, to the electric motor the refrigerant wet-steam quantity which is necessary for cooling. By virtue of this compact construction, additional contacts and lines to the on-board power supply can also be avoided.

Suitable actuating elements in the further expansion member are bimetals, expandable liquids, gases in capillary sensors and similar devices which open or close the valve passage cross section via a closing element as a function of the temperature of the control electronics.

BRIEF DESCRIPTION OF THE DRAWINGS

The invention permits numerous embodiments. Two of these are illustrated diagrammatically in the drawing and are described below. In the drawing.

Identical parts are given the same reference symbols in the figures. It should be understood that the present invention is not limited to the preferred embodiments illustrated.

DETAILED DESCRIPTION OF THE PREFERRED EMBODIMENT

Figure 1:
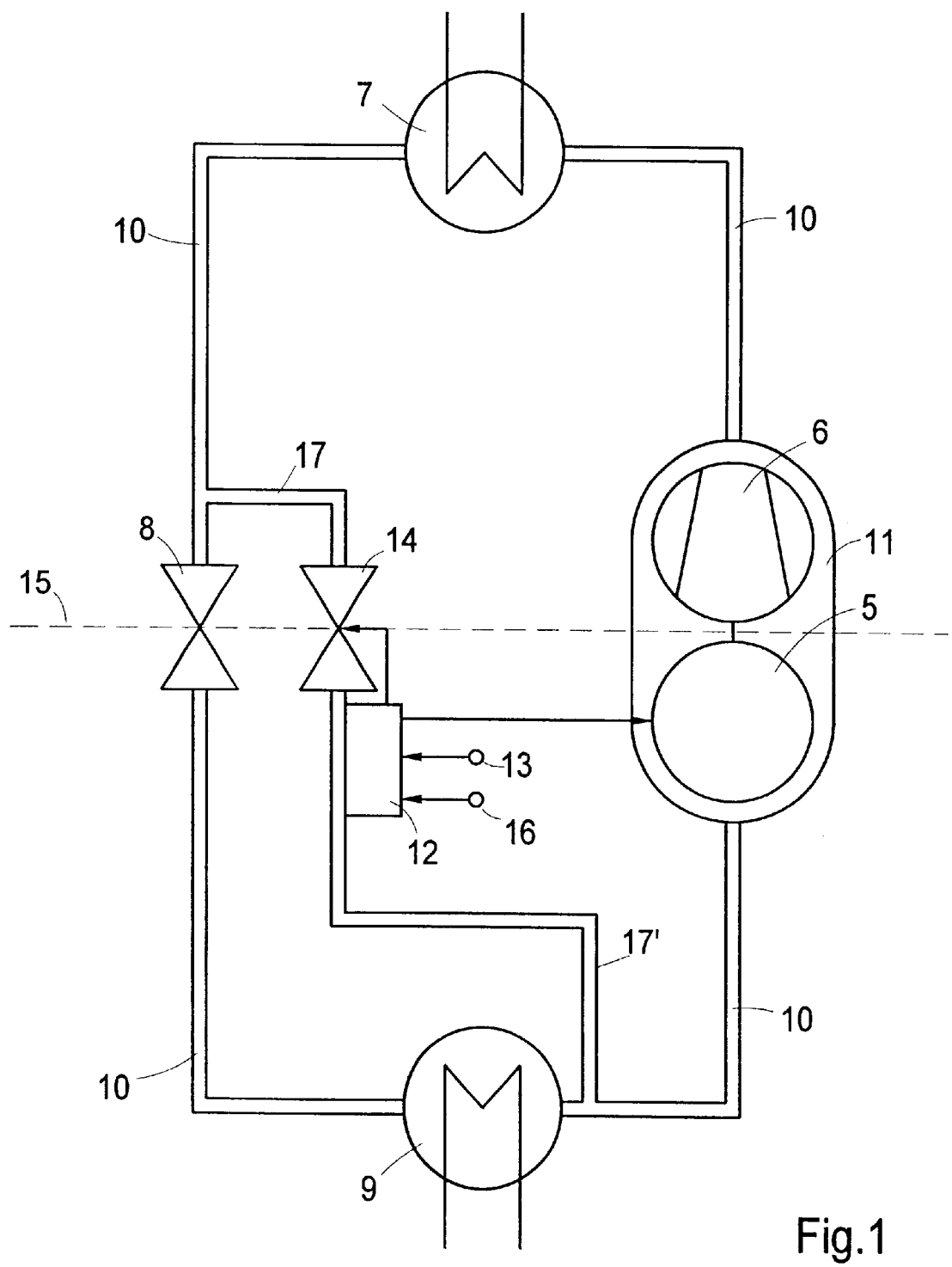
FIG. 1 shows a first exemplary embodiment.

The two figures each show diagrammatically an air-conditioning system. It has a compressor 6 which is driven by an electric motor 5 and which may be, in particular, a spiral compressor known per se. This has the advantage of a continuous low-pulse conveyance of the refrigerant which is not illustrated in the figure. The refrigerating system has, furthermore, a condenser 7, an expansion valve 8 and an evaporator 9. The compressor 6, the condenser 7, the expansion valve 8 and the evaporator 9 are connected by means of refrigerant lines 10 in the way illustrated, so that a continuous circulation of the refrigerant from the compressor 6 via the condenser 7, the expansion valve 8 and the evaporator 9 back to the compressor 6 is achieved. The broken line 15 indicates the boundary between the high-pressure side (top) and the low-pressure side (bottom).

The functioning of air-conditioning systems of this type is known per se and does not need to be explained any further in order to understand the invention. In the exemplary embodiments, the electric motor 5 and compressor 6 are located in a common housing 11 (FIG. 1) or 18 (FIG. 2), the electric motor 5 having the refrigerant flowing around it and therefore being efficiently cooled, this not being illustrated in detail in the figures.

To operate the electric motor 5, in particular to control its respective power, an electronic control device 12 is provided. Particularly in its output stage equipped with power semiconductors, lost power occurs, which, without cooling, may lead to overheating and consequently damage to the control device. In this respect, in both exemplary embodiments, a further expansion valve 14 is arranged, parallel to the expansion valve 8 and to the evaporator 9, via a further refrigerant line 17, 17'. The control device 12 is connected thermally conductively to the line 17' located on the low-pressure side. In order, depending on the operating state, to provide only the necessary refrigerating capacity for cooling the control device 12, the expansion valve 14 is made controllable, control taking place as a function of the temperature of the control device 12.

This results in a closed loop which opens the further expansion valve 14 only to the extent necessary for cooling the control device 12. Apart from an electrical temperature sensor, an electrical controller and an electrical actuator, purely mechanically acting actuating devices may also be used, for example bimetal arrangements. Moreover, the control device 12 has inputs 13 and 16 for delivering a supply voltage and a power presetting for the electric motor 5 which is connected to an output of the control device 12.

Figure 2:
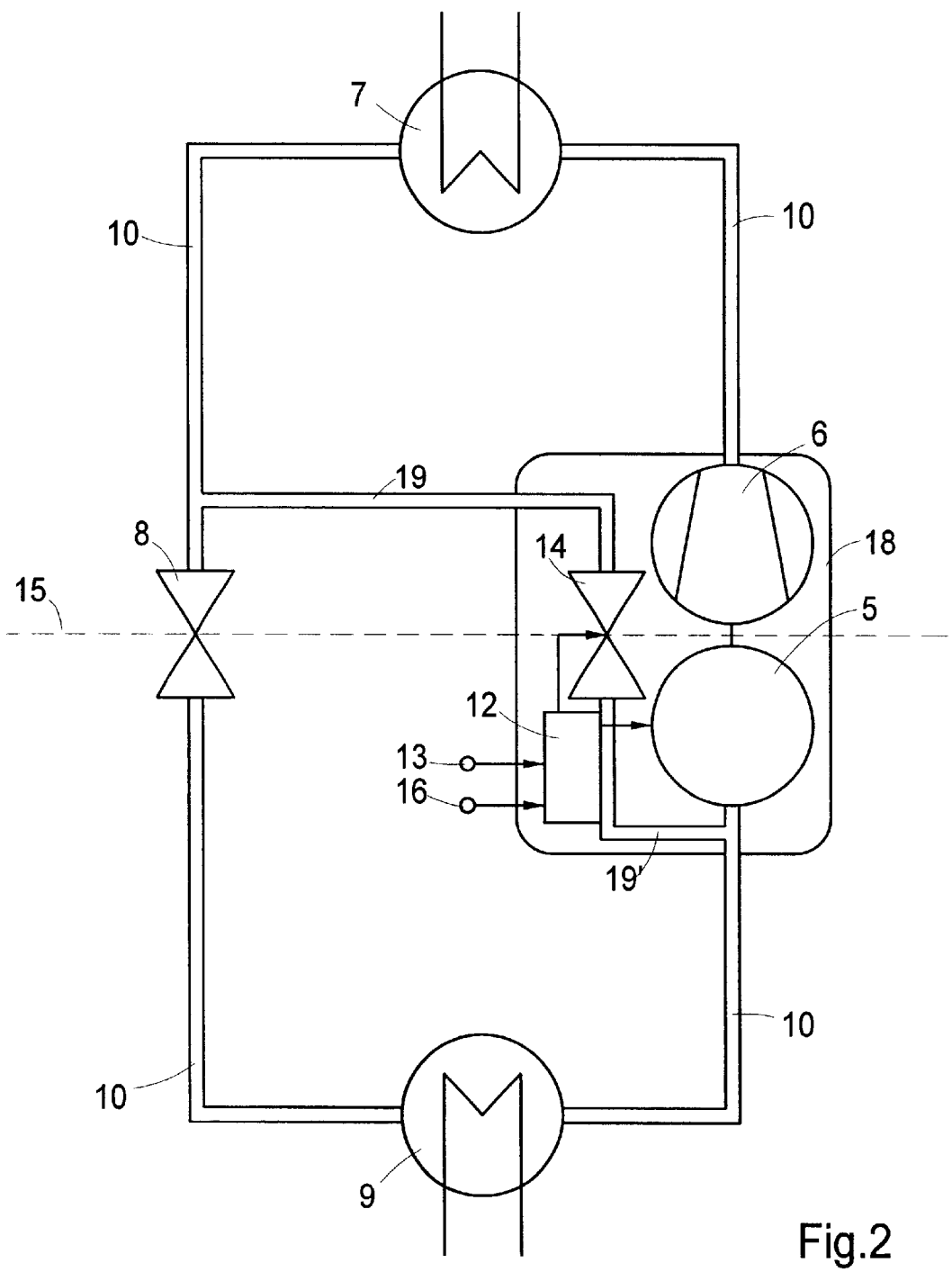
FIG. 2 shows a second exemplary embodiment.

In the exemplary embodiment according to FIG. 1, the further expansion valve 14 and the control device 12 are arranged at any desired location in the air-conditioning system. There is a particularly compact arrangement in the exemplary embodiment according to FIG. 2, in which the further expansion valve 14 and the control device 12 are integrated into the housing 18 of the compressor 6 and the electric motor 5. That part 19' of the line 19, 19' which is located on the low-pressure side is then likewise contained in the housing 18.

Although reference has been made, for the purpose of explanation, to preferred embodiments of an air-conditioning system, it should be understood that modifications and variations can be made in the design and construction of the air-conditioning system to satisfy the particular needs and requirements of the end user without departing from the scope or spirit of the invention. Other embodiments of the invention may be apparent to those skilled in the art from consideration of the specification and practice of the invention disclosed herein.

What is claimed is:

1. An air-conditioning system comprising an air-conditioning compressor, an electric motor and a refrigerant circuit, in particular for motor vehicles, the electric motor being controllable by an electronic control device and an expansion member arranged in the refrigerant circuit, said system further comprising a further expansion member arranged within a housing with the air-conditioning compressor and being arranged between a high-pressure side of the expansion member and a suction side of the air-conditioning compressor in the refrigerant circuit, with the control device connected thermally conductively to a low-pressure side of the further expansion member, and the further expansion member being controllable as a function of the temperature of the electronic control device.

2. The air-conditioning system as claimed in claim 1, further comprising the control device being arranged in the housing.

* * * * *

UNITED STATES PATENT AND TRADEMARK OFFICE
CERTIFICATE OF CORRECTION

PATENT NO. : 6,604,372 B2
DATED : August 12, 2003
INVENTOR(S) : Jochen Baumert et al.

It is certified that error appears in the above-identified patent and that said Letters Patent is hereby corrected as shown below:

<u>Title page,</u>
Item [75], Inventor, substitute -- Jochen Engel, München (DE) -- for "Jochen Engel, Müchen (DE)".
Item [73], Assignee, substitute -- Siemens Aktiengesellschaft, München (DE) -- for "Siemens Aktiengesellschaft, Munich (DE)".
Insert assignee -- BMW AG, München (DE) -- after assignee "Siemens Aktiengesellschaft, München (DE)".

Signed and Sealed this

Fourth Day of November, 2003

JAMES E. ROGAN
*Director of the United States Patent and Trademark Office*